US005183072A

United States Patent [19]

Pengler

[11] Patent Number: 5,183,072

[45] Date of Patent: Feb. 2, 1993

[54] AUTOMATIC SWITCHOVER VALVE

[75] Inventor: Rudolf Pengler, Weehawken, N.J.

[73] Assignee: Matheson Gas Products, Inc., Secaucus, N.J.

[21] Appl. No.: 779,825

[22] Filed: Oct. 21, 1991

[51] Int. Cl.$^5$ ........................ F16K 11/20; G05D 16/06

[52] U.S. Cl. ................................ 137/113; 137/505.14

[58] Field of Search ........... 137/111, 112, 113, 505.14, 137/505.42

[56] References Cited

U.S. PATENT DOCUMENTS

| | | | |
|---|---|---|---|
| 1,960,466 | 5/1934 | Thrall | 50/26 |
| 2,168,701 | 8/1939 | Buttner | 137/113 X |
| 2,197,144 | 4/1940 | Carnes | 221/73.5 |
| 2,354,286 | 7/1944 | Whaley | 62/1 |
| 2,518,894 | 8/1950 | Humbarger et al. | 137/113 |
| 2,693,812 | 11/1954 | Jones et al. | 137/113 |
| 2,966,920 | 1/1961 | Oglesby et al. | 137/113 |
| 3,001,541 | 9/1961 | St. Clair | 137/113 |
| 3,308,817 | 3/1967 | Seeler | 137/112 X |
| 3,643,677 | 2/1972 | Begleiter | 137/113 |
| 3,779,268 | 12/1973 | Conkling | 137/113 |
| 4,889,152 | 12/1989 | Wilson | 137/113 |
| 5,014,733 | 5/1991 | Wilson | 137/113 |

FOREIGN PATENT DOCUMENTS 811915 4/1959 United Kingdom ................ 137/113

OTHER PUBLICATIONS

Product Brochure: CR44-2200 Series, TESCOM Corporation, Pressure Controls Division, no date disclosed.

*Primary Examiner*—Stephen M. Hepperle

*Attorney, Agent, or Firm*—Fitzpatrick, Cella, Harper & Scinto

[57] ABSTRACT

An automatic switchover valve includes first and second regulator valves arranged to oppose each other axially in a single housing, and ducted in a parallel configuration within the housing. Each regulator valve includes an inlet port, a diaphragm poppet valve, and a common outlet port. Each regulator valve includes structure for adjusting the pressure setting of the diaphragm poppet valve. During operation, the poppet valve of the first regulator valve is selectively adjustable between a first setting providing a first pressure $P_1$, and a second setting providing a second pressure $P_2$ less than $P_1$ by an amount equal to 2 p. The poppet valve of the second regulator valve is preset at a reference pressure $P_R$ wherein $P_1 > P_R > P_2$, and $P_1 - p = P_R = P_2 + p$, and wherein p is greater than or equal to the incremental pressure characteristic of the regulator poppet valves.

2 Claims, 2 Drawing Sheets

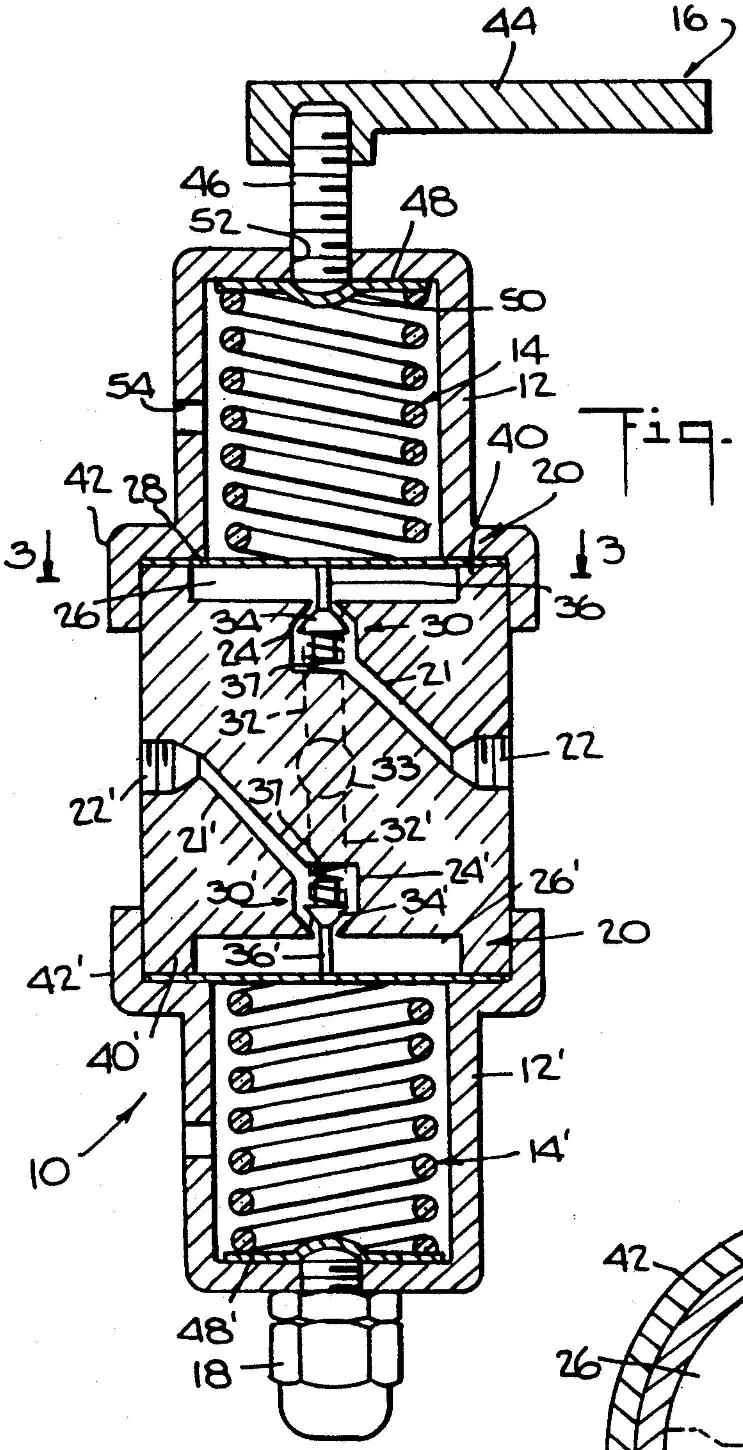
Fig. 1.
Fig. 2.
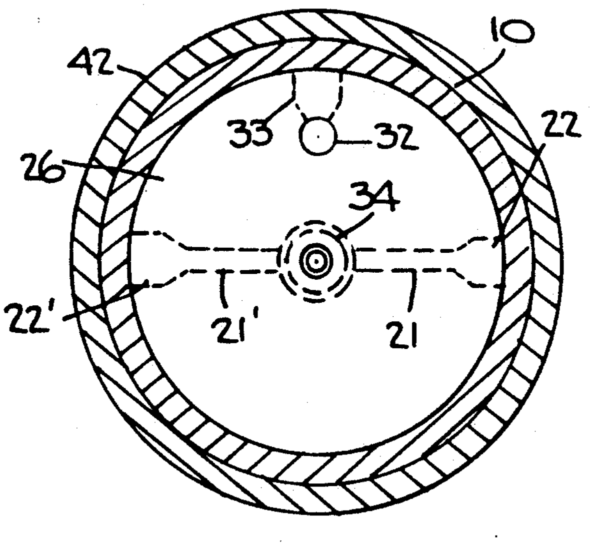

AUTOMATIC SWITCHOVER VALVE

BACKGROUND OF THE INVENTION

1. Field of the Invention

The present invention relates generally to valves for handling pressurized gasses. More particularly, it relates to an automatic switchover valve including first and second regulator valves ducted in a relation for automatically and sequentially providing a continuous supply of pressurized fluid from two sources to a single application.

2. Description of the Prior Art

Many commercial and experimental facilities require a continuous supply of pressurized gas. In many instances, the pressurized gas is stored in tanks or cylinders for easy transport and storage. Therefore, in order to provide a continuous supply of pressurized gas, it is common practice to provide two tanks, a primary tank and a secondary tank, and a switchover valve assembly that permits a user to withdraw gas from the primary tank until it is emptied, and then to switch over to withdraw gas from the secondary tank. When emptied, the primary tank then is replaced. In this manner, by manually switching back and forth between two tanks, a continuous supply of gas is always available.

Automatic switchover valve assemblies are also known. For example, the Tescom Corporation markets a switchover valve assembly, Series CR44-2200, that includes two separate regulator valves connected in parallel. In that assembly, each of the regulator valves is connected at its inlet port to a respective tank or source of pressurized gas. The respective outlet ports then are connected together by piping, to provide a common feed line. In this arrangement, the diaphragm cavities of the respective regulator valves are in fluid communication through the common feed line. Thus, a control lever may be switched to adjust the pressure setting of one regulator valve to a desired pressure, for example, an output pressure of 240 psi, while adjusting the pressure setting of the other regulator valve to a lower pressure, for example, an output pressure of 220 psi, only the regulator valve with the higher pressure setting will permit a flow of gas. In other words, since the gas pressure from the diaphragm cavity of the higher pressure setting regulator valve is connected through the respective outlet ports to the diaphragm cavity of the second regulator valve, the second regulator valve will remain closed, and gas will be provided only from the regulator valve having the higher pressure setting. Then, when the gas in the first tank is depleted and the inlet pressure of the first regulator valve output drops to a level, e.g. 220 psi. This permits the second regulator valve, having a lower pressure setting than the first regulator valve, to open automatically, thereby to provide a continuous supply of pressurized gas. Although this valve assembly has utility in many applications, it has a drawback in that it requires the provision of two regulator valves and connecting piping, together with a switching lever for controlling the actuation of two cams. Thus, it may not be possible to make the valve assembly compact enough for certain applications. Moreover, connections between the valve elements increases the risk of minute outboard and inboard leaks. Minute leaks cause numerous problems, including the contamination of high purity gases which in turn jeopardizes accuracy and/or yield of a process. This is especially important in high resolution analytical work, semiconductor processes and photo/optics processes.

Series connected regulator valves having two valves formed a single housing also are known. For example, a two stage regulator valve may include an inlet port, first and second regulator valves arranged in series, and an outlet port, all constructed within a single housing. Internal ducting, within the housing, couples the output of one of the valves (which has its input connected to the input port) to the input of the other valve (which has its output connected to the output port). The first regulator valve is preset to a first pressure setting substantially less than the inlet pressure, and the second regulator valve is preset to a second pressure setting still lower than the first pressure setting. In this manner, a very accurate final output pressure is obtained by regulating the total pressure drop in two stages. Adjusting levers also may be provided for adjusting the first and second pressure settings.

Automatic switchover valves including two regulator valves arranged in a single housing also are known. For example, U.S. Patent Nos. 2,966,920 (Oglesby), 2,354,286 (Whaley) and 3,001,541 (St. Clair) each describe single housing automatic changeover valves. However, the valves described in each of these patents have a drawback in that each includes "buried" springs for adjusting the pressure settings of the regulator valves. In other words, the construction of these valves requires that they be disassembled in order to adjust the regulator valve spring tensions, which control the outlet pressure. Moreover, in each of these valves, a mechanical linking mechanism is provided between the diaphragms of the respective regulator valves. This mechanical linkage is a drawback in that it introduces inherent mechanical tolerances, and thus creates an additional risk of valve inaccuracy or failure.

SUMMARY OF THE INVENTION

The present invention overcomes these drawbacks of the prior art by providing an automatic switchover valve including first and second regulator valves formed in a single housing. Each regulator valve includes an inlet port, a diaphragm and poppet valve assembly, and an outlet port coupled in common with the other outlet port. The diaphragm and poppet valve assembly of the first regulator valve is selectively adjustable between a first setting providing a first pressure $P_1$, and a second setting providing a second pressure $P_2$ that is less than $P_1$ by an amount equal to 2 p. The poppet valve of the second regulator valve is preset at a reference pressure $P_R$, wherein $P_1>P_R>P_2$, and $P_1-p=P_R=P_2+p$, and wherein p is greater than or equal to the incremental pressure characteristic of the regulator poppet valves.

In operation, the second regulator valve is preset to a fixed outlet pressure, and the first regulator valve is adjusted to provide either a higher or lower outlet pressure than the second regulator valve. When the first regulator is adjusted to the higher setting ($P_1$), it provides primary service or supply of pressurized gas. After automatic switchover due to depletion of the first source of gas, the first regulator may be adjusted to the lower pressure ($P_2$), e.g., by rotation of a spring tension adjust lever and the first source of gas may be replenished, so that the second valve provides primary service until it too becomes depleted. Then, after automatic switchover to the first regulator valve, the lever may be repositioned to again provide a higher pressure setting.

BRIEF DESCRIPTION OF THE DRAWINGS

These and other features and advantages of the present invention readily will be apparent from the following detailed description of the preferred embodiments read in conjunction with the accompanying drawings, wherein:

FIG. 1 is a longitudinal cross-sectional view of a first embodiment of an automatic switchover valve of the present invention, including front and rear inlet ports arranged on opposite sides of a main body of the valve.

FIG. 2 is a cross-sectional view of the automatic switchover valve in FIG. 1 taken along Line 2—2.

DETAILED DESCRIPTION OF THE PREFERRED EMBODIMENTS

Figure 3:
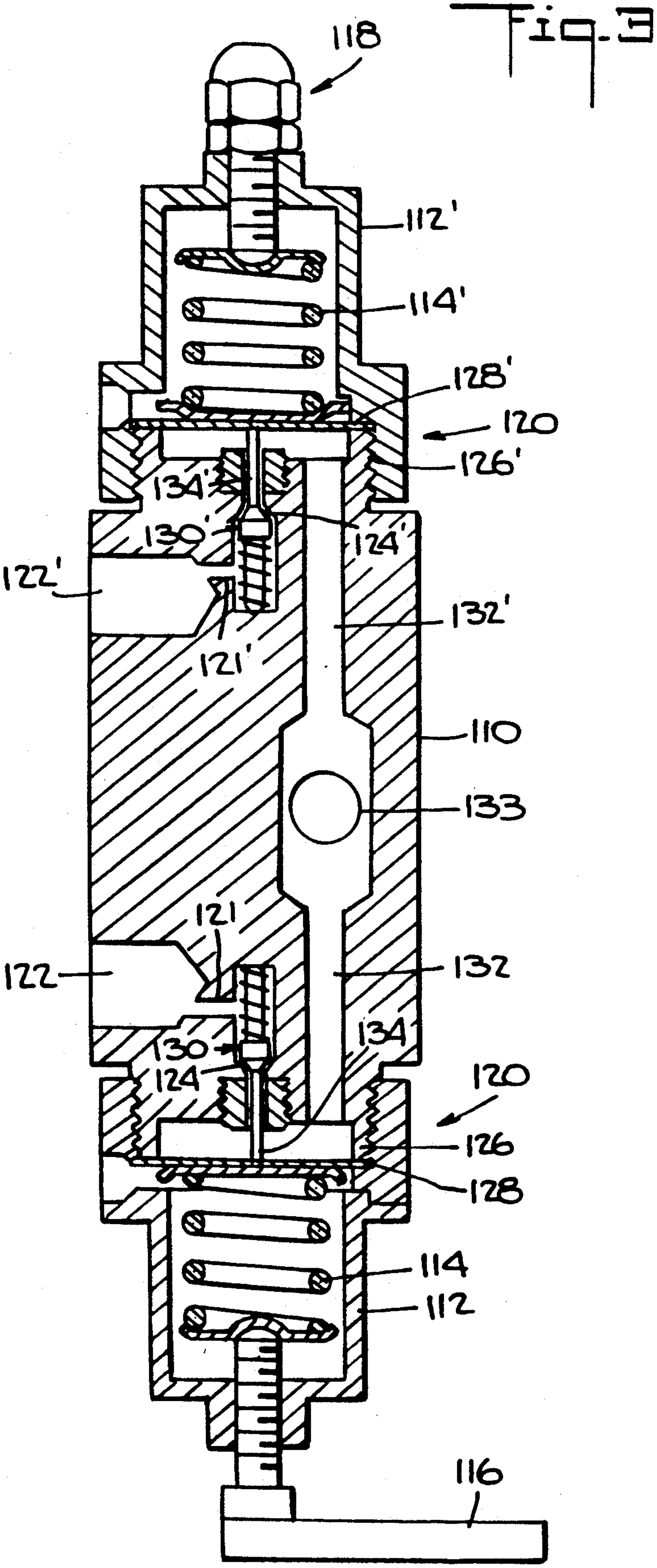
FIG. 3 is a longitudinal cross-sectional view of a second embodiment of an automatic switchover valve of the present invention, including front and rear inlet ports arranged on the same side of a main body of the valve.

Referring to the drawings wherein like reference numbers correspond to like or similar elements throughout, FIGS. 1 and 2 illustrate a first embodiment of an automatic switchover valve of the present invention. Referring specifically to FIG. 1, an automatic switchover valve is shown in longitudinal cross-section. As shown therein, the valve generally includes a main body 10 having first and second spring housings 12, 12', and first and second load springs 14, 14'. A spring tension adjust lever 16 and a spring tension adjust screw 18 are connected to the main body 10 for adjusting the tension in the springs 14, 14'.

Main body 10 generally forms opposed regulator valves, internally ducted in a switchover configuration. More specifically, a first regulator valve 20 is formed by an inlet duct 21 coupled between a first switchover valve input 22 and a valve port 24, a valve chamber 26, a diaphragm 28, a valve poppet 30 having a poppet head 34 disposed in the valve port 24, and an outlet duct 32 connected to the chamber 26. Likewise, a second regulator valve is formed by an inlet duct 21' coupled between a second switchover valve input 22' and a valve port 24', a valve chamber 26', a valve diaphragm 28', a valve poppet 30' having a poppet head 34 disposed in the valve port 24', and an outlet duct 32' connected to the chamber 26' and connected in common to output duct 32 and to a switchover valve output 33.

The first and second valve chambers 26, 26' are formed in a coaxially opposed relation within the main body 10. Specifically, a central main body portion 10' is provided at each end with respective annular chamber walls 40, 40', and the spring housings 12, 12' respectively are provided with annular flanges 42, 42' that mate with chamber walls 40, 40'. When assembled, the diaphragms 28, 28' respectively are disposed between chamber walls 40, 40' and flanges 42, 42' in a fluid-tight manner. In particular, a seal line is formed around the periphery of diaphragms 28, 28'. Main body portion 10' and spring housings 12, 12' may be assembled by any conventional method, such as by mated threads. Those skilled in the art will readily appreciate numerous equivalent methods.

Spring tension adjust lever assembly 16 generally includes a lever arm 44, a drive screw 46, and a spring plate 48 for engaging spring 14. Spring plate 48 further includes a central recess 50 for registering the distal end of drive screw 46. Thus, it will be appreciated that rotation of lever 44 will cause drive screw 46 to advance or retreat through a threaded bore 52 of spring housing 12, thereby increasing or decreasing the spring tension in spring 14 exerted against diaphragm 28.

For improved efficiency and accuracy in operation, spring housing 12 may be provided with a ventilation port 54, to eliminate any possible pressure change in the cavity of spring housing 12 due to deflection of diaphragm 28.

Main body portion 10' may be composed of any material suitable for high pressure gas applications, including brass, stainless steel, etc. Main body portion 10' also may be formed by conventional methods, including machining of cast or forged metal, or bar stock. Those skilled in the art will appreciate numerous alternative equivalent materials and methods of manufacturing, depending on the desired application.

Each of the first and second regulators valves individually operates according to known diaphragm/poppet valve principles. That is, by way of example, pressurized fluid is supplied from a first source to the first switchover valve inlet 22, which is in fluid communication with valve chamber 26 through duct 21 and valve port 24. Fluid flow through valve port 24 is regulated valve poppet 30, which includes a poppet head 34 arranged for seating engagement with valve port 24, and a poppet shaft 36 fixed to the poppet head 34 and coaxially extending through the valve port 24 for engagement with and movement with diaphragm 28. As shown, engagement between the shaft 36 and the diaphragm 28 is maintained by a spring 37 which urges the poppet toward the diaphragm, but such shaft 36 could also be attached to the diaphragm. The diaphragm 28 is biased in a direction toward valve port 24 by spring 14. Thus, it will be appreciated that poppet head 34 is biased in an open position by spring 14, i.e., poppet shaft 36 causes poppet head 34 to be unseated from valve port 24. However, fluid flowing through valve port 24 accumulates at pressure in valve chamber 26 and exerts a force against diaphragm 28 in a direction away from valve port 24. Thus, poppet head 34 is biased toward a closed position as a result of movement of the diaphragm i.e., poppet shaft 36 translates a force from diaphragm 28 along its axis to seat poppet head 34 against valve port 24. Of course, fluid pressure in valve chamber 26 exists in a dynamic state, because fluid exits valve chamber 26 through outlet duct 32. Also, maximum fluid flow through valve port 24 is predetermined by the sizing of inlet duct 21, valve port 24, valve chamber 26 and outlet duct 32. Thus, for a given valve configuration, fluid flow and fluid pressure at common output 33 may be controlled within a predetermined range by adjusting the tension in spring 14.

As is well known in the art, each regulator valve has an associated incremental pressure characteristic which is the change in pressure above or below the desired output pressure that is required to activate or deactivate the regulator valve when operating. For most valves, this incremental pressure is about 5 to 10 psi. In the present invention, the pressures of the first and second valves are set at values which differ by an amount p. For example, the first regulator valve is configured so that, when spring tension adjust screw 18 of the second regulator valve is preset to provide an output reference pressure $P_R$, e.g., 200 psi, spring tension adjust lever assembly 16 is selectively adjustable between a first position which corresponds to a first pressure $P_1$, e.g. 210 psi, and a second position which corresponds to a second pressure $P_2$, e.g., 190 psi. Accordingly, the value p is 10 psi, wherein $P_1 > P_R > P_2$, and $P_1 - p = P_R = P_2 + p$. This relationship of the invention is unique wherein the regulator pressure is fixed for one source during switchover, while the regulator pressure for the other source is varied between levels which are higher and lower than the fixed value.

The first and second regulator valves of the present invention then collectively operate as a two regulator valve switchover assembly. However, the integral body switchover valve configuration of the present invention provides advantages over prior art two-regulator valve assemblies. Initially, since all pressure porting and fluid flow passages are provided within a single, small main body, the automatic switchover valve of the present invention provides the lowest possible Helium leak rate (a measure of minute inboard or outboard leaks), dead volume and entrapment. This characteristic is critical for high purity applications, such as analytic systems and semiconductor manufacturing systems.

The compact size and simple operation of the present switchover valve also reduces the amount of deflection required for operating the valve's poppet mechanism. This permits the automatic switchover valve of the present invention to utilize a metal diaphragm. Thus, since all surfaces of the present valve exposed to the pressurized gas may be composed of metal, the valve provides particular utility in applications of high purity analysis and processes. That is, for example, inboard leaks associated with elastomeric diaphragms are reduced to standards that allow for the most demanding applications.

Those skilled in the art will readily appreciate that the automatic switchover valve of the present invention may be easily manufactured in a wide range of sizes. Thus, the present valve can be configured for a wide range of applications having different pressure ranges and fluid flow ranges.

Those skilled in the art will also readily appreciate that the automatic switchover valve of the present invention may be modified by using regulator valves having tied seats. Thus, the present valve also has particular utility in applications involving toxic gasses.

Referring now to FIG. 3, a second embodiment of an automatic switchover valve is shown in longitudinal cross-section. As shown therein, the automatic switchover valve generally includes a main body 110, first and second spring housings 112, 112', first and second load springs, 114, 114', a spring tension adjust lever 116 and a spring tension adjust screw 118. Further, first and second regulator valves 120 and 120' are formed respectively by first and second inlet ducts 121, 121' connected to inputs 122, 122', first and second valve ports 124, 124', first and second valve chambers 126, 126', first and second diaphragms 128, 128', first and second poppet valves 130, 130', and commonly connected outlet ducts 132, 132' coupled to common switchover valve output 133.

The function of the respective elements in the embodiment of FIG. 3 is the same as in the embodiment of FIGS. 1 and 2. However, as shown therein, first and second inputs 122, 122' are arranged on the same side of main body 110, and the common output 133 is arranged to exit the main body 110 at substantially a right angle to inputs 122, 122'. It will be appreciated that this configuration may provide advantages in particular applications in which access to the switchover valve is limited.

In summary, the automatic switchover valve of the present invention provides a compact structure that may be used in applications having limited space and accessibility. Also, since the valve is compact, including low volume internal porting and minimal external connections, it provides a high purity valving system required for handling certain pressurized gases, such as toxic and high purity gases. Finally, the simple valve construction is reliable and user friendly through safe, easy operation, and has lower unit manufacturing and installation costs due to decreased hardware and labor requirements.

Numerous other embodiments and modifications will be apparent to those skilled in the art and it will be appreciated that the above description of the preferred embodiments is illustrative only. It is not intended to limit the scope of the present invention, which is defined by the following claims.

What I claim is:

1. An automatic switchover valve, comprising:

a main body including first and second regulator valves formed therein, each regulator valve including an inlet port, a diaphragm and poppet valve assembly, and an outlet port, wherein the main body includes internal ducting which couples the regulator valve inlet ports to respective switchover valve inputs for connection to separate sources of gas, and couples the regulator valve outlet ports in common to a single switchover valve output, and wherein said ducting coupled to said switchover valve output comprises a channel formed in said main body between a diaphragm chamber of said second regulator valve, and provides fluid communication therebetween;

means for selectively adjusting the poppet valve of said first regulator valve between a first setting providing a first regulator pressure $P_1$ and a second setting providing a second regulator pressure $P_2$ less than $P_1$;

means for setting said second regulator valve to a reference regulator pressure $P_R$, wherein $P_1 > P_R > P_2$; and $P_1 - \Delta p = P_R = P_2 + \Delta p$.

2. The automatic switchover valve of claim 1, wherein the diaphragm and poppet valve assembly of said first regulator valve includes a diaphragm which forms a diaphragm chamber, wherein said first inlet port communicates with said chamber, a poppet head disposed to open and close said inlet port of said first regulator valve, said poppet head being coupled for movement with said diaphragm between a seated and unseated position in said first inlet port, and a compression spring exerting a force on said diaphragm, and wherein said means for selectively adjusting the poppet valve of said first regulator valve comprises a spring compression adjusting lever coupled to said compression spring and disposed for movement between two positions to change the force exerted by said spring on said diaphragm.

* * * * *